No. 691,234. Patented Jan. 14, 1902.
F. BOWEN.
MACHINE FOR CUTTING, PUNCHING, AND SHAPING METAL.
(Application filed Feb. 23, 1901.)
(No Model.) 5 Sheets—Sheet 1.

Fig. 1.

No. 691,234. Patented Jan. 14, 1902.
F. BOWEN.
MACHINE FOR CUTTING, PUNCHING, AND SHAPING METAL.
(Application filed Feb. 23, 1901.)
(No Model.) 5 Sheets—Sheet 2.

Fig. 2.

Witnesses.
Inventor.
Faxon Bowen

No. 691,234. Patented Jan. 14, 1902.
F. BOWEN.
MACHINE FOR CUTTING, PUNCHING, AND SHAPING METAL.
(Application filed Feb. 23, 1901.)
(No Model.) 5 Sheets—Sheet 4.

Witnesses. Inventor
Faxon Bowen.

No. 691,234. Patented Jan. 14, 1902.
F. BOWEN.
MACHINE FOR CUTTING, PUNCHING, AND SHAPING METAL.
(Application filed Feb. 23, 1901.)
(No Model.) 5 Sheets—Sheet 5.

Witnesses.
Inventor,
Faxon Bowen

UNITED STATES PATENT OFFICE.

FAXON BOWEN, OF PETERBORO, NEW HAMPSHIRE.

MACHINE FOR CUTTING, PUNCHING, AND SHAPING METAL.

SPECIFICATION forming part of Letters Patent No. 691,234, dated January 14, 1902.

Application filed February 23, 1901. Serial No. 48,410. (No model.)

*To all whom it may concern:*

Be it known that I, FAXON BOWEN, a citizen of the United States, residing at Peterboro, county of Hillsboro, State of New Hampshire, have invented an Improvement in Machines for Cutting, Punching, and Shaping Metal, of which the following description, in connection with the accompanying drawings, is a specification, like figures on the drawings representing like parts.

This invention relates to metal-working machines which are adapted to cut suitable lengths from a sheet of metal and punch the same and subsequently to the cutting and punching operations and before the severed length of material is removed from the bedplate to shape or form the said severed length between suitable dies.

As one convenient manner of applying my invention I have illustrated the same as especially adapted for cutting, punching, and shaping metal shanks for shoes, although I desire to state that the invention is not limited to such use, but may obviously be employed whenever it is desired to cut lengths from a sheet of metal and punch and shape the same.

The invention comprises a suitable frame, including a bed-plate, in which is fixedly mounted a bed or fixed knife, and coöperating with said fixed knife is a movable knife which may be operated by any suitable mechanism, preferably cam mechanism. Suitable means are employed for intermittingly feeding the sheet of metal to the knives, the feeding mechanism being inactive when the knives are coöperating to cut a length of material from the sheet, and as the knives are separated the feeding mechanism operates to move the sheet of material forward sufficiently to have the next length severed.

The invention further comprises a suitable punching mechanism which is preferably situated between the knives and the feeding mechanism, and, as illustrated, the said punching mechanism includes a punch, which is operated in unison with the movable knife, and a die adjustably mounted upon the bed of the machine. With this arrangement of parts the sheet of metal is punched prior to its being cut into lengths, and the punching mechanism and cutting mechanism will be so arranged that the knives will sever the material between the apertures punched therein.

My invention further comprises a forming or shaping mechanism which coöperates with the cutting mechanism to give the severed lengths the desired shape before they are removed from the bed of the machine. For this purpose one of the die members of the forming device is situated directly in line with the movable knife, whereby after the knives have cut the length from the sheet of metal the movable knife clamps the severed length between the same and the fixed die member. As the movable knife begins to recede the coöperating die member is moved into the position occupied by the knife by suitable mechanism, and the two die members are afterward brought together to give the severed length of material the requisite shape. The shaping or forming mechanism is so constructed that after the severed length of material is shaped a portion thereof is elevated slightly above the cutting edge of the fixed or bed knife, so that when the feeding mechanism operates to give to the sheet of material its forward movement the forward edge of said sheet will engage that portion of the shaped length of material which projects above the fixed knife and operate to push said severed and shaped length from between the die members.

My invention therefore comprises a device wherein the cutting, punching, and shaping of pieces of metal may be accomplished practically simultaneously and automatically.

Figure 1:
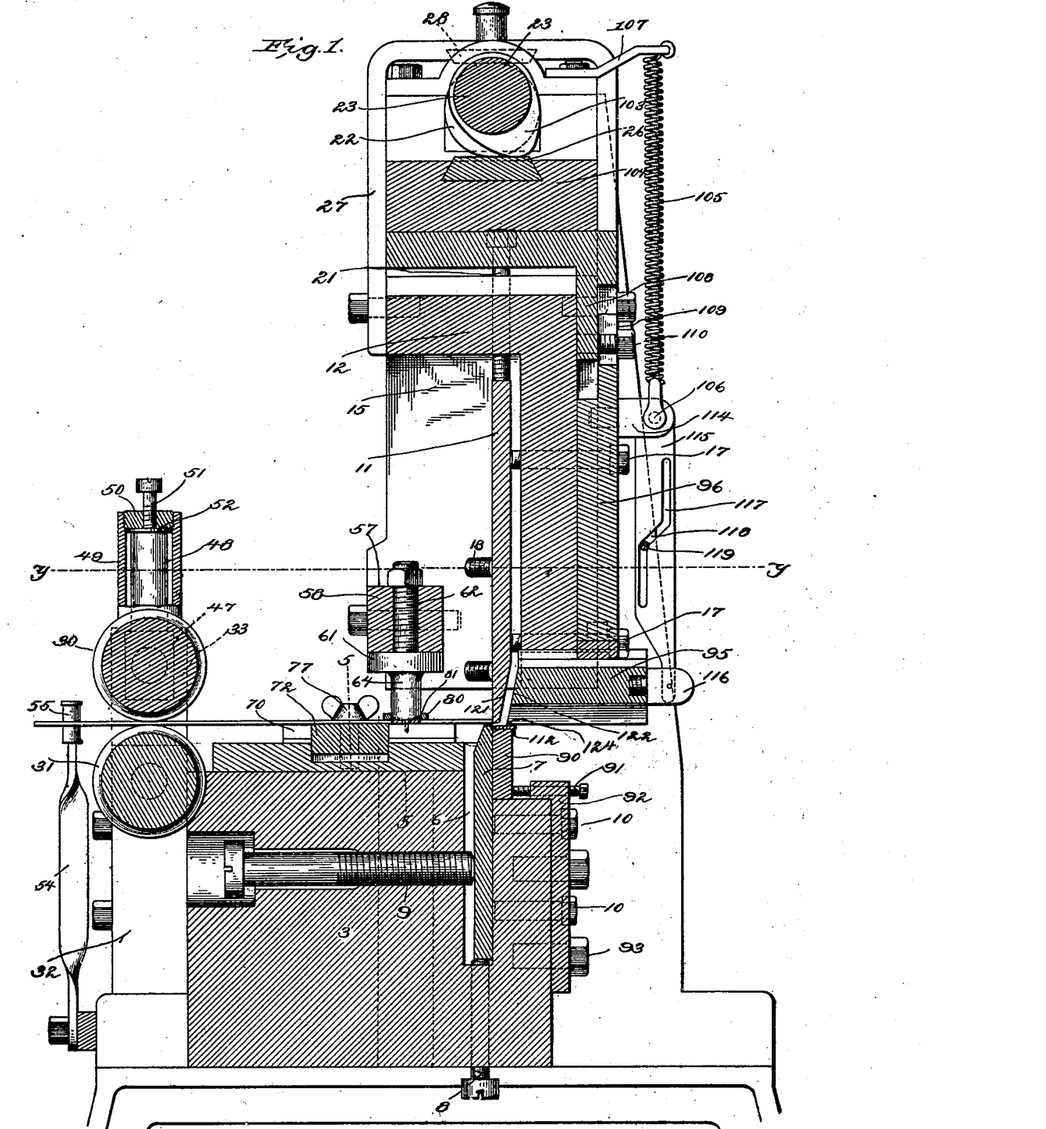
Figure 1 is a vertical section of my device on the line $x\ x$, Fig. 2.
Figure 2:
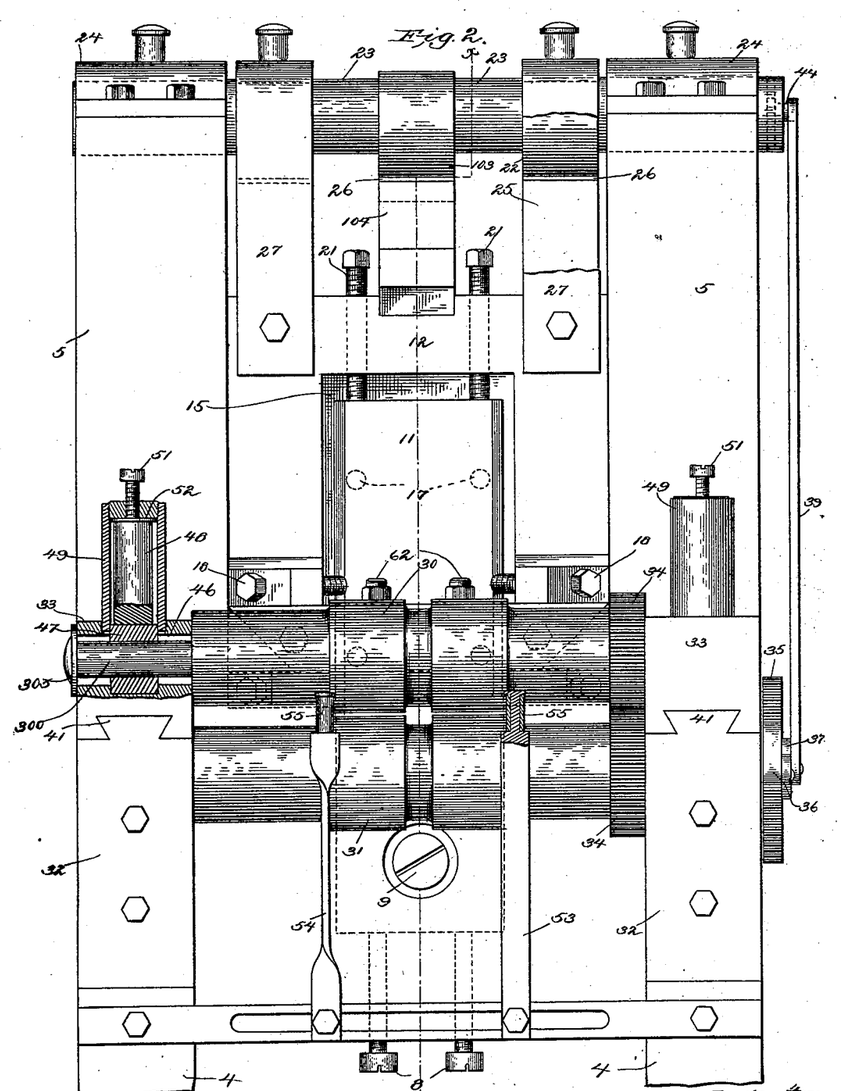
Fig. 2 is a front elevation.
Figure 3:
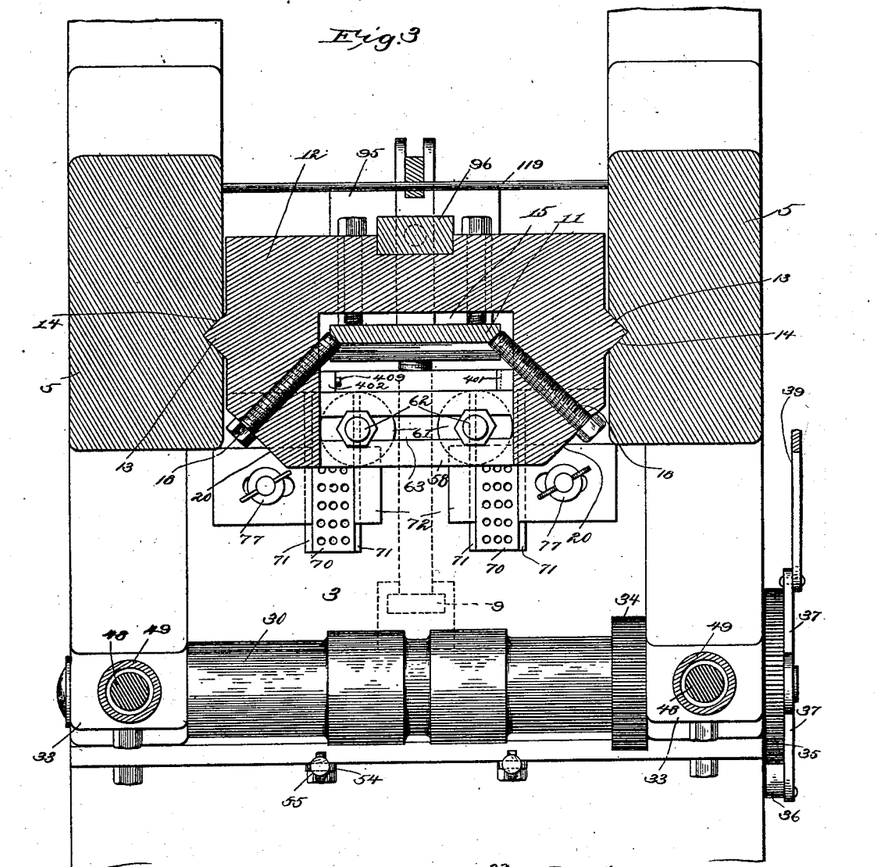
Fig. 3 is a horizontal section on the line $y\ y$, Fig. 1.

The frame of the machine includes the bed 3, which is supported upon suitable legs 4 and has the arms 5 extending upwardly therefrom, said arms supporting at their upper end the cam mechanism for operating the movable knife, as will be presently described. The bed of the machine is provided with a suitable recess 6, in which is fixedly supported the bed or fixed knife 7, the said knife preferably resting at its lower end upon suitable screws 8, which are tapped into the bottom of the bed and being held in place by the bolt 9, which is tapped in from the front of the machine and bears against the front of the bed-knife approximately centrally thereof. The rear face of the knife rests against suitable screws 10, which are tapped in from the rear of the bed, the purpose of clamping the said knife between the screws 9 and 10 being to provide means whereby the knife may be adjusted and brought into perfect alinement with the movable knife. The screws 8 also furnish means for bringing the cutting edge of the knife into any desired position. The movable knife is designated by 11, and this is conveniently mounted in and carried by a head-block 12, the said head-block having on its outer edges the ribs 13, which play in corresponding grooves 14 in the inside of the arms 5, the arms thus serving to guide the head-block, and consequently the movable knife, in its reciprocations. The head-block 12 is shown as provided with the recess 15, in which the knife 11 is adjustably supported, the said knife bearing at its rear face against the adjusting-screws 17 and having the adjusting-screws 18 tapped in diagonally through the side walls of the recess 15, as best seen in Fig. 3, the said side walls being beveled, as at 20, for this purpose, the said diagonal adjusting-screws 18 bearing against the outer edges of the knife 11. (See Fig. 3.) The cutting edge of the movable knife is brought into proper alinement by the adjusting-screws 21, which are tapped in through the top of the head-block and rest upon the top of the knife 11, as seen best in Fig. 2. The head-block, with the movable knife, is reciprocated by means of suitable mechanism shown as cams 22, mounted upon the shaft 23, which shaft is supported in suitable bearings 24 in the upper ends of the arms 5. Preferably I employ two cams 22, as illustrated in Fig. 2, the said two cams operating against blocks 25, which are attached to the head-block at either side thereof, said blocks having the bearing 26 of suitable material, such as chemical bronze. From this description it will be seen that as the shaft 23 revolves the cams 22, operating upon the bearings 26, will cause the head-block and movable knife 11 to descend, whereby a length of metal is cut from the sheet. In order to lift the movable knife, I provide straps 27, which have suitable bearings 28 therein, the said straps passing over the shaft and being secured to the front and rear sides of the head-block. The cam 22 as it revolves operates against the bearing 28 to raise the knife, as will be readily understood. The shaft 23, it will be understood, is driven by any suitable mechanism. (Not shown.)

Figure 8:
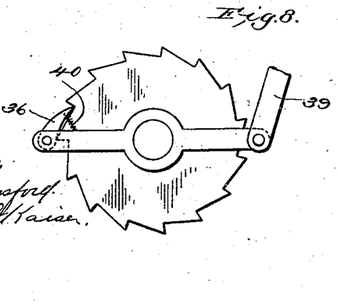
Fig. 8 is a view of the feeding mechanism.

In connection with the cutting mechanism above described I employ a feeding device which operates to intermittently feed the sheet of material to the knives, and such feeding device is shown as feed-rolls 30 31, the feed-roll 31 being suitably journaled in the bearing-blocks 32, which are bolted to the bed of the machine, and the roll 30 being journaled in removable bearings 33, whereby the top roll and the bearings may be readily removed whenever desired. Each roll has fast thereon suitable gears 34, which mesh with each other, whereby the rotation of the lower roll 31 by means presently described operates to rotate the upper feed-roll. The shaft for the lower feed-roll has fast thereon at its outer end a suitable ratchet-wheel 35, which coöperates with the feed-pawl 36, said pawl being mounted in the end of an arm 37, which is pivoted upon the end of the shaft of the feed-roll, as seen in Fig. 8, and which has one end connected by the link 39 to a suitable crank mechanism upon the end of the shaft 23. Fig. 8 illustrates one simple crank connection, wherein the end of the shaft 23 is provided with a dovetailed slot 44, and a headed bolt 45 is adjustably mounted in said slot, said bolt 45 being pivotally connected to the upper end of the link 39. With this construction it will be apparent that the rotation of the shaft 23 operates to vibrate the arm 37, and since the pawl 36 is held against the ratchet-teeth by the spring 40 it will be seen that the ratchet-wheel 35, and consequently the feed-rolls, will be intermittently rotated. By using a ratchet-wheel having more or less teeth and by properly adjusting the bolt 45 in the slot 44, so as to give the arm 37 the correct length of vibration to correspond with the number of teeth on the ratchet-wheel 35, it will be obvious that the machine may be so adjusted as to feed the sheet of metal forward any desired distance, so that the lengths which are cut therefrom may be of any width.

Figure 4:
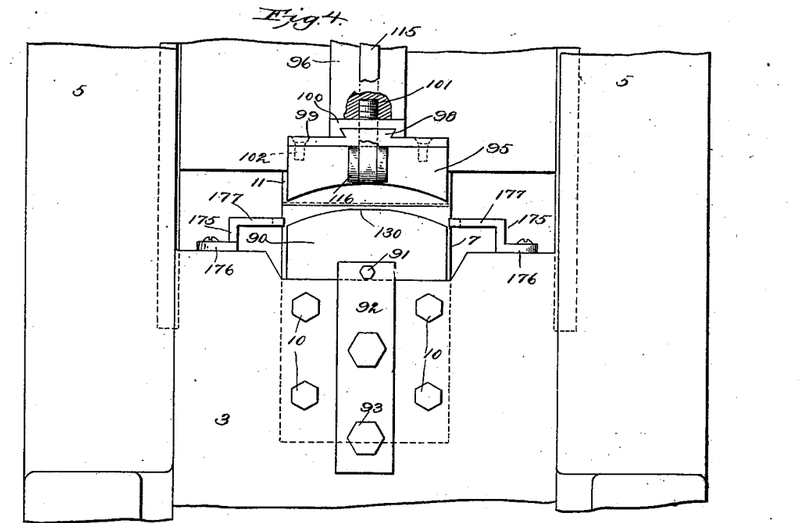
Fig. 4 is a partial rear elevation showing the coöperating die members of the shaping device.
Figures 11, 12, 13, 17:
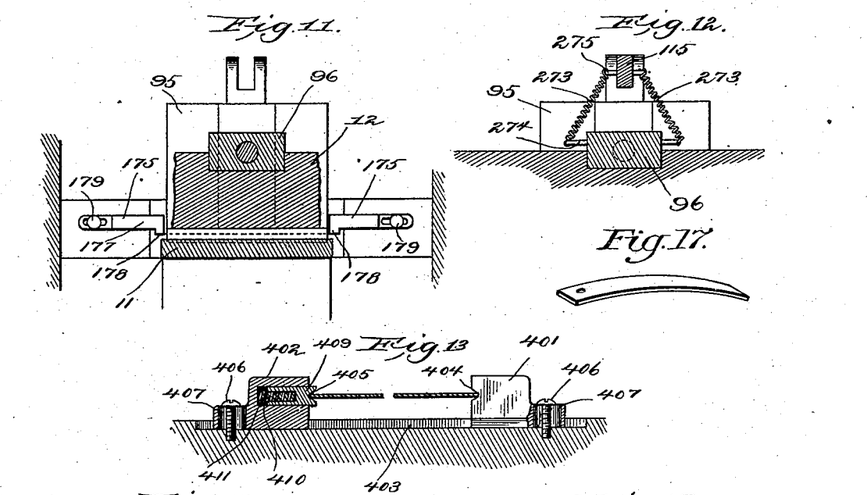
Fig. 11 is a partial section showing the gages for limiting the forward movement of the sheet of metal.
Fig. 12 is a modified form of mechanism for giving the movable die member its horizontal movement.
Fig. 13 shows a guide for the sheet of material just before it is delivered to the cutting mechanism.
Fig. 17 is a perspective view of a shoe-shank after being punched and shaped by my machine.

In order to positively insure that the severed lengths of metal may all be of the same width, I provide the stop-gages shown in Figs. 4 and 11 at 175, said gages being adapted to limit the forward feed of the sheet of metal. These gages may be of any suitable construction and are provided with a nose or shoulder which may be brought into position to engage the outer corner of the sheet of metal as it is fed forward. Preferably each gage comprises the slotted base 176, which is secured to the bed by any suitable means, such as screws 179, from which base is extended inwardly the offset arm 177, terminating in a nose 178. The offset arm is on the same level as the top or cutting edge of the lower knife 7, and in practice the gages being adjustable by means of the slot in the base 176 are so positioned that as the sheet of metal is fed forward the inner end of the nose 178 of each gage will be engaged by the outer edge of the front end of the said sheet of metal, thus stopping the sheet in the correct position to have a length of the proper width cut therefrom. By adjusting the gages toward or from each other they may be accommodated to sheets of metal of different widths, and by swinging said gages toward or from the bed or fixed knife the width of the length of the material which is cut off from the sheet may be varied.

As stated above, the upper feed-roll 30 is preferably mounted in removable bearings, and, referring to Fig. 2, it will be seen that the bearing-blocks 32 for the lower feed-roll 31 are provided at their upper ends with the dovetailed projections 41, and the bearings 33 for the upper roll have a corresponding dovetailed groove in which the said projections fit, from which construction it will be evident that the bearings 33 may be readily removed whenever desired. The top roll 30 is preferably yieldingly mounted in its bearings, and as the said top roll and its bearings are removable from the machine I have provided a form of yielding connection between the said top roll and its bearings, in which the said roll is always securely held in its bearing and cannot be dislodged therefrom when the top roll-bearings are removed from the machine.

Figure 9:
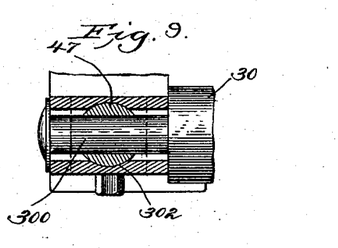
Figs. 9 and 10 are details of the bearing for the upper feed-roll.
Figure 10:
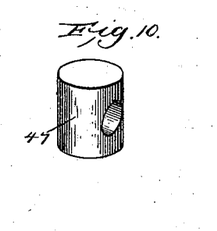

Referring to Figs. 2, 9, and 10, the top roll 30 has at its ends spindles or journals 300, which rotate in yieldingly-mounted boxes 47, which are shown as cylindrical in shape and mounted for vertical play in the bearings 33, the said bearings having the vertical bore 302 to receive said boxes. The upper ends of said boxes 47 project slightly into the lower ends of cylindrical casings or housings 49, which are rigidly secured to the upper sides of the bearings 33 in any suitable way, and inclosed in each of said housings or casings is an elastic cushion-piece 48, which is preferably in the nature of a rubber block, said rubber block resting at its lower end on the tops of the boxes 47 and bearing at its upper end against an adjusting-screw 51, which works in a cap-piece 52, screwed into the top of said casing 49. Preferably a bearing-plate 52 will be inserted between the adjusting-screw and the rubber block 48. By manipulating the adjusting-screws 51 the pressure of the top roll upon the sheet of metal may be varied, it being understood that the transverse aperture 46 through the bearings 33 is sufficiently large to admit of the requisite vertical movement of the boxes 47. The ends of the spindles 300 are preferably provided with collars or flanges 305, so as to prevent the bearings 33 from sliding off from the ends of said spindles when the top roll and its bearings are removed from the machine. With this construction the top roll and its bearings are securely bound together and cannot become separated when removed from the machine.

To properly guide the sheet being fed as it passes through the feed-rolls, I may employ, if desired, the side guides 53 54, the same being shown as arms bolted at the lower end to the bed of the machine and supporting at their upper ends the spools 55, which spools bear against the sides of the sheet or strip of metal being fed to the knives. Preferably the arm 54 will be in the nature of a spring-arm, whereby the spool or roll mounted thereon may yield somewhat to accommodate slight variations in the width of the sheet.

To guide the front end of the sheet of metal, or that end which is adjacent the cutting-knives, so that the said sheet will be fed to the knives perfectly true, I preferably employ the guiding mechanism shown in Fig. 13, which comprises the oppositely-disposed guiding-blocks 401 and 402, said blocks being preferably slidably mounted in a transverse groove 403 in the bed 3 of the machine and having the guiding-notches 404 and 405, which are adapted to receive the side edges of the sheet of metal. The said guiding-blocks are adjustably sustained in the groove 403 by means of the screws 406, which pass through slots 407 in said blocks, as seen in Fig. 13. The block 402 has its guiding-notch 405 in a yieldable member 409, which is sustained in a socket 410 in said block, a spring 411 serving to maintain the yielding member 409 against the sheet of metal.

In connection with the cutting mechanism above described I employ a punching mechanism, and preferably the said punching mechanism is situated between the knives and the feed-rolls, whereby the sheet of material is punched prior to its being cut. I have in this embodiment of my invention illustrated my punch as operating in unison with the movable knife, and for this purpose the side walls of the head-block 12 are provided at their lower ends with suitable grooves or recesses 57, in which is supported a cross-bar 58, said cross-bar serving as a support for the punch or punches, hereinafter described.

Figures 6, 7:
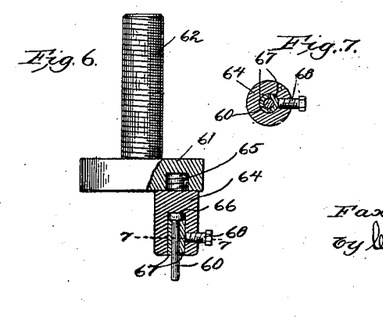
Fig. 6 is an enlarged view of one of the punches employed.
Fig. 7 is a section on the line 7 7, Fig. 6.

Referring to Figs. 6 and 7, the punch proper is designated by 60, and this is supported in a suitable holder, shown as a disk 61, having the screw-threaded shank or stem 62, which passes through a slot 63, extending longitudinally of the cross-bar 58, (see Fig. 3,) the said punch-holder being held in the slot by suitable nuts screwed upon the end of the shank 62. The slot 63 allows for adjusting the punch transversely of the machine, and to provide for adjusting the same longitudinally of the machine or at right angles to the plane of the knives I preferably mount the punch 60 eccentrically in the disk 61, whereby turning of the disk 61 about its center operates to throw the punch forward or backward, as the case may be. In Fig. 6 it will be seen that the disk 61 has secured to the under side thereof the socket-piece 64, which preferably has a screw-threaded shank 65 screwed into the disk 61 at one side of the center thereof, as seen in Fig. 6, the said socket-piece 64 having a central socket, in which the punch 60 is sustained. The upper end of the punch will preferably rest against a steel plate 66, and the punch will be held between two half-bushings 67, a suitable set-screw 68 being employed to clamp the half-bushings together. By loosening the nuts on the ends of the shanks 62 the punches may be moved into any position across the bed of the machine, and by turning the disks 61 the punches may be brought nearer or farther from the knife.

Figure 5:
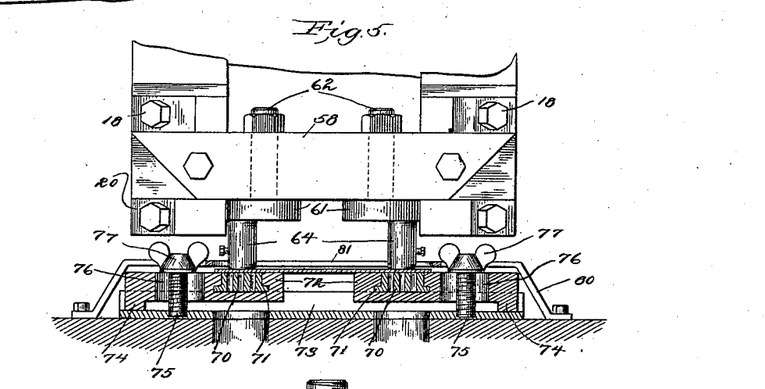
Fig. 5 is a section on the line 5 5, Fig. 1.
Figure 16:
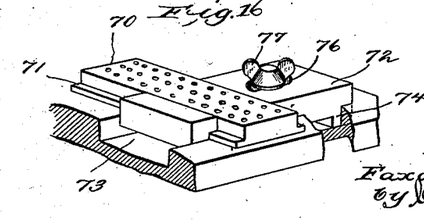
Fig. 16 is a perspective view of a portion of the die which coöperates with the punch.

When the machine is used to cut and punch metal shoe-shanks, I will preferably employ two punches, as seen in Figs. 2 and 5, the said punches being arranged to punch holes in the sheet of metal near the edge thereof, whereby the severed lengths will have holes at their ends, as usual in shoe-shanks. Coöperating with the punches are suitable dies having holes therein into which the end of the punch passes after passing through the metal, and these dies may be adjustably mounted upon the bed-plate, whereby the distance between the same may be varied according to the position desired for the holes in the metal. Figs. 5 and 16 illustrate one way of securing the dies in position, and in said figures the dies are designated by 70, and they are shown as having an elongated or rectangular shape, the length thereof extending lengthwise of the bed or perpendicular to the plane of the knife. Each die has the base-flanges 71, the said dies being sustained in transverse grooves in the die-holders 72. The die-holders extend transversely of the dies 70 and are confined in a suitable groove 73, extending transversely across the bed of the machine. The outer end of each die has the downturned flange or lug 74, which rests upon the bottom of the slot 73, the inner end of said die-holder being sustained by the die, which extends across the slot and rests on the bed-plate, as plainly seen in Figs. 5 and 16. Suitable clamping means are provided for clamping the die-holder to the bed-plate, such clamping means being shown as bolts 75, extending up from the bed through suitable slots 76 in the die-holders and winged nuts 77, screwed upon the bolts 75. From this construction it will be obvious that by tightening the nuts 77 the inner ends of the die-holders will operate to clamp and securely hold the dies 70 tightly against the bed of the machine. To adjust the die to any desired position, it is only necessary to loosen the nuts 77, when the die-holders may be moved transversely of the machine-bed and the dies moved longitudinally thereof. It will thus be seen that I have provided a universal adjustment both for the punches and for the dies, this being quite an important feature, because it is often desirable to punch the holes in the shoe-shanks at different distances from the ends thereof.

In order to prevent the sheet of metal from rising when the punches are withdrawn from the blocks, I provide a suitable holder for the same, the said holder being shown as the strap 80, which is secured at its ends to the bed of the machine outside of the die-holders and is bent upwardly at its central portion and passes over the said dies, the sheet of metal passing underneath the strap 80 and between the same and the dies, as seen in Fig. 5. Preferably I provide the strap with the central longitudinal slot 81, through which the socket-pieces 64 of the punches pass when the punch is in its lowermost position. (See Fig. 1.)

Heretofore in making metal shanks for shoes it has been customary to cut the length of material from the sheet on one machine and then transfer the same to a second and independent machine in order to form or shape the same. This requires an extra machine and extra labor, and it is one of the objects of my invention to combine with the cutting and punching mechanism a suitable forming or shaping mechanism, which is so constructed as to operate upon and form the severed length of material before its removal from the bed of the machine.

The shaping mechanism comprises suitable coöperating die members, one of which is situated directly in line with the movable knife, and is so positioned that as the length of material is cut by the knives it falls upon said die member, and as the movable knife descends it operates to clamp the said severed length between the same and the fixed die member. A coöperating movable die member is operated by suitable mechanism, so that as the knife begins to move upward the said movable die member is thrown into the position occupied by the movable knife, and thus holds the severed length of material between the same and the fixed die member. The die members are then brought together to bend or shape the material properly, and during the bending or shaping of the material a certain portion thereof is brought above the level of the lower knife, whereby as the feeding mechanism feeds forward the sheet for the next cut the severed length is pushed from the fixed die member automatically by the moving sheet of metal. The fixed die member is designated by 90, and this may be either the male or the female die member, the said die member being supported in a suitable recess in the rear of the bed-plate and abutting the back side of the fixed knife 7, as plainly seen in Fig. 1. The fixed die member is held in place by the set-screw 91, which passes through the head of an L-shaped holder 92, the said holder being rigidly secured to the end of the bed-plate, as by bolts 93. As illustrated in the drawings, the fixed die member 90 is the male member and the movable die member 95 is the female die member; but I desire it understood that I may reverse this order and make the fixed member the female member, if desired. The movable member 95 is mounted for both vertical and horizontal movement, it being shown as slidingly attached to the lower end of a holder 96, which is slidingly mounted in a suitable groove in the back side of the head-block 12, the said holder 96 being given a vertical movement independent of the head-block by means of suitable cams and springs, as will be presently described. One convenient way of connecting the movable die member 95 to the holder 96 for horizontal sliding movement is to provide the top of the said movable die member with the dovetailed rib 98, which engages a corresponding groove in the end of the holder 96, the rib 98 running in a direction perpendicular to the plane of the knives. For convenience in changing the movable die member when it is desired to use different shapes I preferably make the rib 98 upon a separate plate 99, which is detachably secured to the top of the die member 95, as by screws 102, and the groove in which the rib 98 runs is made in a separate plate 100, having the screw-threaded stem 101, which is screwed into the end of the holder 96.

Referring now to the means for giving the holder its vertical reciprocations, it will be seen that the shaft 23 is provided with a suitable cam 103, which coöperates with the block 104, situated between the blocks 25 on the head-block 11 and rigid with the holder 96. The cam 103 therefore will operate to depress the holder, and consequently the movable die member 95, and to raise the same I may use the coiled spring 105, which is attached at its lower end to the holder, as at 106, and at its upper end to a suitable arm 107, fast on the arms 5.

It is sometimes desirable to regulate the length of the stroke or movement of the movable die member 95, and this may be accomplished by adjustably connecting the holder 96 to the block 104, one convenient way of doing this being shown in Fig. 1, wherein the upper end of the holder is cut away to receive the depending arm 108, rigid with the block 104, and is provided with a vertical slot 109, through which the set-screws 110 pass, the said set-screws operating to secure the holder 96 to the block 104 in any desired position. By raising or lowering the holder 96 with reference to the block 104 it will be evident that the effective movement of the die member 95 may be regulated.

Fig. 1 shows the movable knife in its lowest position, and, as stated above, when in this position it operates to clamp the severed length of material (designated by 112) between the same and the fixed die member 90, and the cams 103 and 22 are so timed that as the knife 11 begins to recede from its extreme position the movable die member 95 is forced down onto the severed length of material 112, and thus takes the place of the knife holding the severed length of material onto the fixed die member 90. Before, however, the material can be formed properly it is necessary to give to the movable die member 95 a movement in a direction at right angles to the plane of the knife in order to bring the same directly over the fixed die member 90. Various devices for this purpose may be used, and in Fig. 1 I have shown one simple mechanism wherein the holder 96 is provided with the forked lug 114, between the branches of which is pivoted the link 115, the said link at its lower end being pivoted to a lug 116 on the end of the die member 95. The link 115 is provided with the slot 117, having the diagonal or inclined portion 118, and through the slot is passed a fixed guide-pin 119, which is secured at its ends in any suitable way to the arms 5. With this construction it will be seen that as the holder 96 is raised or lowered by the cam 103 or spring 105 the inclined portion 118 of the slot 117 will by its coöperation with the pin 119 give to the die member 95 a motion at right angles to the knife, and the slot is so situated that this horizontal movement of the die member takes place just as the knife recedes, with the result that the die member is forced into the position occupied by the knife in Fig. 1. Instead of the slotted link (shown in Fig. 1) I may employ a spring or springs 273, (see Fig. 12,) which are attached at one end to the holder 96, as at 274, and at the other end to the link 115, as at 275, the spring serving to maintain the inner end of the die member 95 continually against the knife 11. It will be noted by reference to Fig. 1 that the knife is beveled, as at 121, and the inner end of the movable die member has a corresponding bevel 122, so that when the spring is employed the beveled end 122 of the die member rests against the beveled face 121 of the knife. With this construction as soon as the knife begins to recede the spring above referred to operates to force the die member to the left in Fig. 1, keeping the face 122 continually against the face 121 of the knife, as will be readily understood. After the die member 95 has been moved horizontally, either by the spring or by the slot in the link, until the nose 124 thereof contacts with the back side of the knife 7 the cam 103, operating upon the block 104, brings the said movable die member down against the fixed die member 90, and thus bends or shapes the severed length 112 to the proper form. I have given my die members such a shape that after the material has been bent the highest portion thereof is slightly above the upper edge of the fixed knife 7, whereby when the feeding mechanism operates to feed the sheet of metal forward the front edge of said sheet will engage the severed and formed or shaped material and push the same from between the die members.

Figure 14:
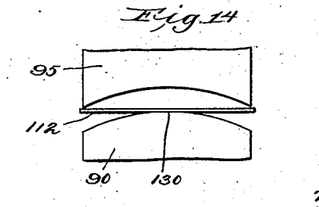
Figs. 14 and 15 are diagrammatic views of the die members.
Figure 15:
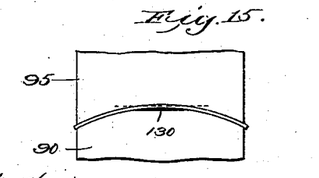

In Figs. 4 and 14, wherein the male die member is the fixed die member, it will be seen that the upper portion thereof is flattened, as at 130, and as the knives cut off a length of material 112 it drops and is supported upon the said flattened portion 130, (see Fig. 14,) the movable knife clamping the same in such position, as stated above. The position of the material at this point is seen in Fig. 14. The female die member has a continuous curve, as shown in Figs. 4 and 14, and as the same is depressed to shape the severed length of material 112 the said strip of material is bent downward at its ends and will be sprung upward in the center to conform to the curve of the female die member, the said metal springing off from the flat portion 130, as will be readily understood. (See Fig. 15.) The center of the shaped metal after being bent is slightly above the upper edge of the lower knife 7, which is shown in dotted lines in Fig. 15, and it will be readily seen that when the feeding mechanism operates to move the sheet of metal forward it will engage the center of the formed strip of metal and push the same from between the die members.

In case the fixed die member 90 is the female member and the movable member 95 the male member then the outer ends of the strip of metal as it is formed will be bent up slightly beyond the level of the upper edge of the lower knife and will therefore be engaged by the sheet of metal in the same way.

From the above description it will be seen that I have combined in a single machine a cutting and punching and shaping mechanism, the same operating to automatically cut, punch, and shape lengths of metal, and the shaping devices are so constructed as to operate upon the severed length of material and shape the same before its removal from the bed of the machine. Believing that I am the first to thus combine with a cutting and punching device a forming mechanism which operates to form the material before its removal from the bed-plate, I desire to claim the same broadly, and I would consider as coming within my invention any device which accomplished this object.

It will be obvious to those skilled in the art that various changes may be made in the structure of the device without departing from the spirit of my invention.

Having described my invention, what I claim, and desire to secure by Letters Patent, is—

1. In a machine of the class described, cutting mechanism, said cutting mechanism operating to cut a sheet of metal into lengths, the cuts extending transverse to the line of feed, means to bend the severed lengths transverse to the line of feed prior to their removal from the cutting-bed and means to feed the sheet to said cutting mechanism, the said sheet in its forward movement operating to force the shaped lengths of metal from the machine.

2. In a machine for cutting and shaping metal, cutting mechanism including fixed and movable knives, and means to shape the severed length of material prior to its removal from the cutting-bed, said means including coöperating die members, one of said die members being situated directly under the movable knife.

3. In a machine for cutting and shaping metal, a fixed and a movable knife, means to reciprocate the movable knife, a fixed die member in line with the movable knife, a coöperating movable die member, and means to move the same, the movable knife operating to hold the severed length of metal on the fixed die member until the movable die member is in operative position.

4. In a machine for cutting and shaping metal, a fixed and a movable knife, means to feed a sheet of metal to said knives, a fixed die member in line with the movable knife, a movable die member, and means to operate the same, the movable knife operating to hold the severed length of material on the fixed die member until the movable die member comes into operative position, the movable die member, as the knife is receding, shaping the metal between the same and the fixed die member.

5. In a machine for cutting and shaping metal, a fixed knife, and a vertically-movable knife, means to feed a sheet of metal to said knives, a fixed die member directly beneath said movable knife, a movable coöperating die member, and means to move the same both vertically and horizontally, the movable knife in its lowest position operating to hold the severed lengths of metal on the fixed die member until the movable die member is in operative position, and as the movable knife is withdrawn the movable die member moving horizontally over the fixed die member.

6. In a machine of the class described, a fixed knife, and a vertically-movable knife, a fixed die member directly beneath the movable knife, a coöperating movable die member, a vertically-movable holder or support, said movable die member being slidingly attached to the lower end thereof, means to reciprocate said movable knife, and means to give the movable die member a movement transverse to the movement of the movable knife, whereby as the said movable knife is withdrawn the movable die member is brought into the position occupied thereby and coöperates with the fixed die member to shape the severed length.

7. In a machine of the class described, a fixed knife, a head-block carrying a movable knife, means to reciprocate the head-block, a fixed die member in line with the movable knife, a coöperating movable die member, a holder or support therefor slidingly sustained by the head-block, said movable die member being slidingly held by said support, the movable knife after cutting off a length of metal operating to hold the severed length on the fixed die member until the movable die member descends into operative position, and means to move the movable die member as the knife ascends into the position occupied by said knife.

8. In a machine for cutting and shaping metal shanks, a suitable frame, a fixed knife mounted in the bed thereof, a vertically-movable head-block, a knife adjustably mounted therein and coöperating with the fixed knife to cut lengths from a sheet of metal, a shaft supported in said frame above said head-block, cams on said shaft operating to reciprocate the head-block, a fixed die member supported on the bed of the frame directly underneath the movable knife, a coöperating movable die member, a support therefor slidingly sustained by said head-block, said movable die member being mounted on said support for movement transverse to the plane of the knives, and a cam on said shaft for reciprocating said support.

9. In a machine of the class described, cutting mechanism including fixed and movable knives operating to cut a sheet into lengths with the cuts extending transversely to the line of feed, a punch operating in unison with the movable knife, means to bend the severed lengths transverse to the line of feed prior to their removal from the cutting-bed, and means to feed the sheet to said cutting mechanism, the sheet in its forward movement operating to force the severed lengths from the machine.

10. In a machine of the class described, cutting mechanism, including a fixed and a movable knife, a punch operating in unison with the movable knife, and means to shape the severed length of material prior to its removal from the cutting-bed, said shaping means comprising a fixed die member in line with the movable knife, and a movable coöperating die member, the movable knife operating to hold the severed length of material on the fixed die member until the movable die member is brought into operative position.

11. In a machine of the class described, cutting mechanism including a fixed and a movable knife, means to intermittently feed a sheet of metal to said knives whereby lengths are severed from said sheet, an adjustable punch, means to operate the same in unison with the movable knife, an adjustable die coöperating with said punch, the punch and die being situated between the feeding mechanism and the knives, combined with coöperating die members to shape the severed lengths of metal, one of said die members being in the line of movement of the movable knife.

12. In a machine of the class described, a fixed knife, a reciprocating head-block, a movable knife carried thereby, means to intermittently feed a sheet of metal to said knives, said knives operating to cut the sheet on lines transverse to the line of feed, and a punch carried by said head-block between the feeding means and the movable knife, combined with means to bend the severed lengths of metal on lines parallel to the line of cut prior to the removal of said severed lengths from the cutting-bed the sheet in its forward movement operating to force the shaped lengths from the machine.

13. In a machine of the class described, a fixed knife, a reciprocating head-block, a movable knife carried thereby, means to intermittently feed a sheet of metal to said knives, a slotted bar supported on said head-block, and a punch adjustably mounted in said slot.

14. In a machine of the class described, a cutting-bed, a knife fixed therein, a reciprocating head-block, and guiding means therefor, a movable knife mounted in said head-block, a slotted bar rigidly secured to said head-block, and a punch-holder having a shank adjustably secured in said slot, and carrying a punch eccentric to said shank, whereby the punch may be adjusted both longitudinally and transversely of the bar.

15. In a machine of the class described, a cutting-bed, a knife fixed therein, a reciprocating head-block and guiding means therefor, a movable knife sustained by said head-block, a slotted bar parallel to the cutting-bed and rigidly secured to said head-block, a punch-holder having a concentric shank adjustably supported in said slot, and a punch eccentrically sustained in said punch-holder whereby the punch may be adjusted both longitudinally and transversely of said bar.

16. In a machine of the class described, a bed having a groove therein, a die extending across the groove and resting at its ends on the bed at either side of the groove, a die-holder in said groove and operating to clamp the die to the bed, combined with a punch coöperating with said die.

17. In a machine of the class described, a bed having a groove therein, a die-holder adjustable in said groove, a die adjustably carried by said die-holder and extending transverse to the groove, said die resting at its ends on the bed at opposite sides of the groove, combined with a punch coöperating with the said die.

18. In a machine of the class described, a bed having a groove therein, a die-holder adjustably mounted in said groove, said die-holder having a dovetailed groove therein transverse to the grooves in the bed, a die adjustable in the groove in the holder and resting at its ends on the bed on opposite sides of the groove in the bed, and means to clamp the holder in the last-named groove.

19. In a machine of the class described, a bed, an adjustable die-holder seated in a groove therein, said die-holder having a transverse rib at one end resting on the bottom of the groove, a die extending transversely of the die-holder at the other end thereof and adjustably supported in a dovetailed groove therein, the ends of the die resting on the bed on opposite sides of the groove in said bed, and means to clamp the die-holder to the bed.

20. In a machine of the class described, a cutting-bed, fixed and movable knives, and punching mechanism including an adjustable die-holder seated in a groove transverse to the cutting-bed, and having a dovetail groove therein and extending lengthwise of said cutting-bed, a die fitted in said dovetail groove and resting at its ends upon the cutting-bed, means to clamp the die-holder to said bed, and means to operate the punch and movable knife in unison.

21. In a machine of the class described, a cutting-bed, fixed and movable knives, and punching mechanism including an adjustable die-holder seated in a groove in said bed, said die-holder having a transverse rib at one end resting on the bottom of the groove, a die extending transversely of the die-holder at the other end thereof, and adjustably supported in a dovetail groove therein, the ends of said die resting on the bed, and means to clamp the die-holder to the said bed.

22. In a machine of the class described, a fixed and a movable knife, means to operate the movable knife, and means to feed a sheet of metal to said knives, said means comprising a pair of fixed rolls and means to rotate the same, fixed bearings for one of said rolls, and removable bearings for the other of said rolls, said removable bearings being detachably secured to the fixed bearings.

23. In an apparatus of the class described, a fixed and a movable knife, means to operate the movable knife, and means to feed the material to be cut to said knives, said feeding means including a pair of feed-rolls, fixed bearings for one of said rolls having a dovetail projection thereon, and removable bearings for the other roll having a groove to fit said projection.

24. In a machine of the class described, a fixed and a movable knife adapted to cut lengths from a sheet of metal, means to shape the severed lengths prior to their removal from the cutting-bed, and automatic means to feed the sheet of metal to said knives, the said sheet of metal in its forward movement operating to force the shaped length of metal from the shaping mechanism.

25. In a machine of the class described, a cutting-bed, a knife fixed therein, a movable knife, said knives being adapted to cut lengths from a sheet of metal, a pair of coöperating die members, one of said die members being adapted to receive the severed length of material from the knives, means to bring said die members together to shape the severed length between them, and feeding mechanism adapted to feed the sheet of metal forward and to force the shaped lengths from between the die members.

26. In a machine of the class described, a cutting-bed, a knife fixed therein, and a vertically-movable knife, said knives being adapted to cut lengths from a sheet of metal, a fixed die member adjacent the fixed knife, a movable die member, means to operate said movable die member, the fixed die member being adapted to receive the severed lengths of metal from the knives, and the movable die member when in its extreme position having a portion of its working face slightly above the cutting edge of the fixed knife whereby when the length of metal is shaped a portion thereof will project above said fixed knife, and means to feed the sheet of metal forward, the front edge of such sheet of metal during its forward movement engaging the projecting portion of the shaped length and forcing the same from between the die members.

27. In a machine of the class described, a fixed and a movable knife, means to feed a sheet of metal to said knives, a fixed die member, a coöperating movable die member, the fixed die member being situated in line with the movable knife whereby the severed length of material falls upon said fixed die member, and the movable die member when in its lowest position having a portion of its shaping-face slightly above the cutting edge of the fixed knife, whereby the severed length of material when shaped by the dies has a portion thereof projecting slightly above the edge of the fixed knife, so that the sheet of metal as it is fed forward engages the same and forces it from between the die members.

28. In an apparatus of the class described, cutting mechanism including fixed and movable knives and means to feed the material to be severed to said knives, said feeding means including a pair of feed-rolls, bearing-blocks therefor, the bearing-block for one of said rolls having apertures larger than the journals of said roll, and having box-receiving openings transverse thereto, and boxes supporting said journals yieldingly mounted in said openings.

29. In an apparatus of the class described, cutting mechanism including fixed and movable knives and means to feed the material to be severed to said knives, said feeding means including a pair of feed-rolls, bearing-blocks therefor, the bearing-blocks for one of said rolls having vertical cylindrical boxes for the journals of the said roll, said boxes being mounted for vertical movement in said bearings, cylindrical casings fixedly mounted on said bearing-blocks, tension devices inclosed in said casings and resting on the said boxes, and means connected to the casings to apply tension thereto.

In testimony whereof I have signed my name to this specification in the presence of two subscribing witnesses.

FAXON BOWEN.

Witnesses:
JOHN C. EDWARDS,
LOUIS C. SMITH.